(12) United States Patent
Lu et al.

(10) Patent No.: US 7,846,532 B2
(45) Date of Patent: Dec. 7, 2010

(54) SOUND REDUCING WEDGE SHAPED POLYMER INTERLAYERS

(75) Inventors: Jun Lu, East Longmeadow, MA (US); Brian James Daer, Riverview, MI (US)

(73) Assignee: Solutia Incorporated, St. Louis, MO (US)

( * ) Notice: Subject to any disclaimer, the term of this patent is extended or adjusted under 35 U.S.C. 154(b) by 859 days.

(21) Appl. No.: 11/081,947

(22) Filed: Mar. 17, 2005

(65) Prior Publication Data

US 2006/0210776 A1  Sep. 21, 2006

(51) Int. Cl.
- *G02B 27/00* (2006.01)
- *B32B 3/00* (2006.01)
- *B32B 17/10* (2006.01)
- *B32B 27/00* (2006.01)

(52) U.S. Cl. ............... 428/156; 428/172; 428/437; 359/630; 345/7; 296/84.1; 156/102

(58) Field of Classification Search .............. 428/156, 428/172, 437; 359/630, 894; 345/7; 264/177.1; 156/99, 102; 296/84.1
See application file for complete search history.

(56) References Cited

U.S. PATENT DOCUMENTS

| | | | |
|---|---|---|---|
| 4,998,784 A | 3/1991 | Freeman | |
| 5,013,134 A | 5/1991 | Smith | |
| 5,066,102 A | 11/1991 | Hirano | |
| 5,066,525 A | 11/1991 | Nakamachi | |
| 5,087,502 A | 2/1992 | Esposito | |
| 5,108,479 A | 4/1992 | Hirano | |
| 5,130,174 A | 7/1992 | Esposito | |
| 5,137,560 A | 8/1992 | Ohmura | |
| 5,190,826 A | 3/1993 | Asahina | |
| 5,340,654 A | 8/1994 | Ueda | |
| 5,639,538 A | 6/1997 | Wong | |
| 5,812,332 A * | 9/1998 | Freeman | ............... 359/894 |
| 5,945,199 A | 8/1999 | Morin | |
| 6,261,398 B1 | 7/2001 | Costa | |
| 6,921,509 B2 * | 7/2005 | Moran et al. | ............ 264/173.16 |
| 2002/0086141 A1 | 7/2002 | Sauer | |
| 2002/0172804 A1 | 11/2002 | Sauer | |
| 2003/0026964 A1 | 2/2003 | Muromachi | |
| 2003/0035939 A1 | 2/2003 | Muromachi | |
| 2004/0166288 A1 | 8/2004 | Travis | |
| 2004/0219365 A1 * | 11/2004 | Yuan et al. | ............ 428/423.1 |

FOREIGN PATENT DOCUMENTS

| | | |
|---|---|---|
| EP | 0710545 | 5/1996 |
| EP | 1063205 | 12/2000 |
| EP | 1281690 | 5/2003 |
| JP | 2229742 | 9/1990 |
| JP | 3204890 | 9/1991 |
| JP | 4317443 | 11/1992 |
| JP | 5138840 | 6/1993 |
| JP | 5310449 | 11/1993 |

(Continued)

*Primary Examiner*—Donald Loney
(74) *Attorney, Agent, or Firm*—Lewis, Rice & Fingersh, L.C.

(57) ABSTRACT

The present invention is in the field of polymer interlayers and multiple layer glass panels comprising polymer interlayers, and, more specifically, the present invention is in the field of wedge shaped polymer interlayers.

46 Claims, 1 Drawing Sheet

FOREIGN PATENT DOCUMENTS

| | | |
|---|---|---|
| JP | 06-115980 | 4/1994 |
| JP | 7097240 | 4/1995 |
| JP | 7172879 | 7/1995 |
| JP | 07206483 | 8/1995 |
| JP | 10036146 | 2/1998 |
| JP | 11255827 | 9/1999 |
| JP | 2000191348 | 7/2000 |
| JP | 2000272936 | 10/2000 |
| JP | 2000272937 | 10/2000 |
| JP | 2000319044 | 11/2000 |
| JP | 2000326445 | 11/2000 |
| JP | 2001048601 | 2/2001 |
| JP | 2001106554 | 4/2001 |
| JP | 2001106556 | 4/2001 |
| JP | 2001192243 | 7/2001 |
| JP | 2001206742 | 7/2001 |
| JP | 2001206743 | 7/2001 |
| JP | 2001220183 | 8/2001 |
| JP | 2001220184 | 8/2001 |
| JP | 2001226152 | 8/2001 |

* cited by examiner

SOUND REDUCING WEDGE SHAPED POLYMER INTERLAYERS

FIELD OF THE INVENTION

The present invention is in the field of polymer interlayers and multiple layer glass panels comprising polymer interlayers, and, more specifically, the present invention is in the field of wedge shaped polymer interlayers.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a poly(vinyl butyral) sheet, or interlayer, disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to reduce ultraviolet (UV) and/or infrared (IR) light transmission, and/or enhance the appearance and aesthetic appeal of window openings.

Safety glass interlayers have also been used as an important component in automobile head-up display (HUD) systems, which can provide, for example, an instrument cluster image at the eye level of a driver of the automobile. Such a display allows a driver to stay focused on the upcoming road while visually accessing dash board information. One type of interlayer used in such head-up display systems is wedge shaped in vertical cross section. The wedge shape of the interlayer is used to provide the correct light dynamics through the windshield required for a head up display. Unfortunately, as with standard windshields, head up display windshields can also lead to an undesirablely high noise transmission level through the windshield.

Accordingly, further improved compositions and methods are needed to enhance the sound dampening characteristics of multiple layer glass panels, and specifically multiple layer glass panels in which a wedge shaped interlayer is used to provide for head-up display capability.

SUMMARY OF THE INVENTION

The present invention provides interlayers that can be used in multiple layer glass panel type applications to reduce the amount of sound transmitted through the panel, and, in particular, at coincident frequencies for such glass laminates, for example in the range of about 2,000 to 6,000 Hertz. This effect is achieved by incorporating an acoustic polymeric interlayer into wedge shaped laminated glass applications, and, more specifically, into wedge shaped windshield applications.

DETAILED DESCRIPTION

Figure 1:
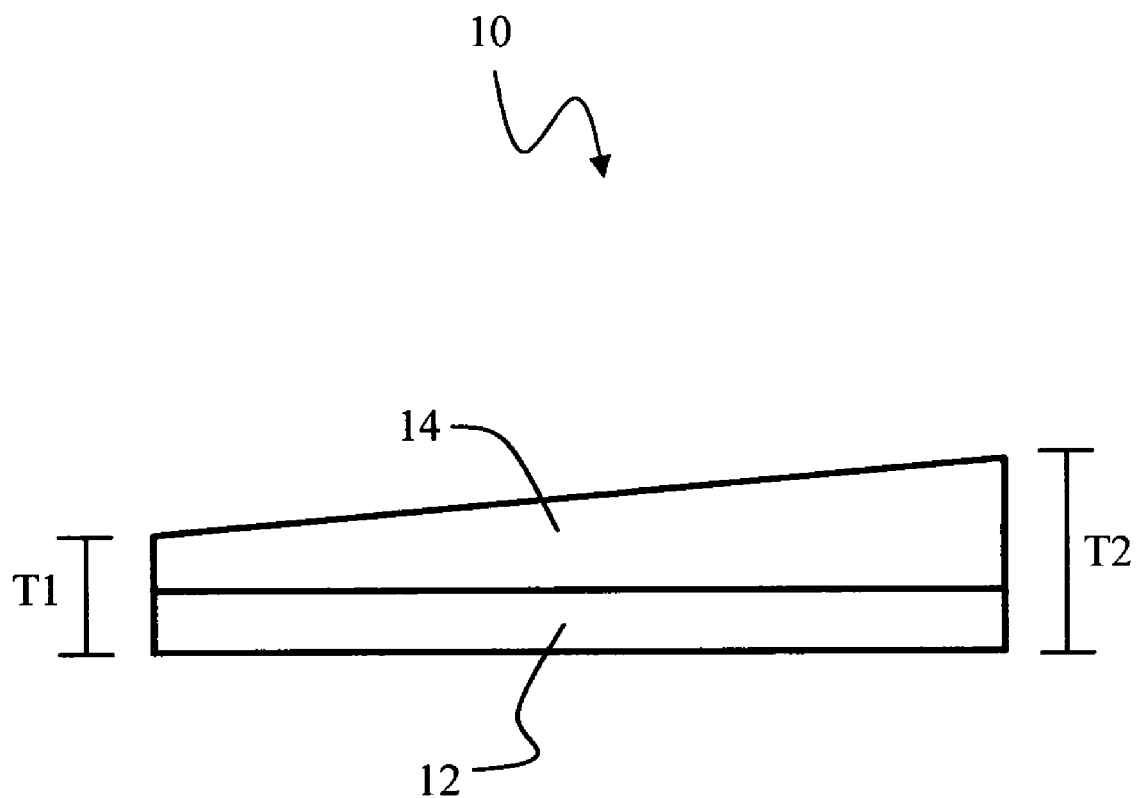
FIG. 1 is a schematic representation of one embodiment of a wedge shaped interlayer of the present invention.

Now, according to the present invention, it has been discovered that wedge shaped windshield interlayers incorporating an acoustic polymer sheet can advantageously be used to limit sound transmission through a windshield and into a vehicle. Wedge shaped interlayers of the present invention are particularly useful in automobiles in which a "heads up" display is provided and for which non-parallel glass layers are typically used in the windshield laminate.

As will be described in detail herein, windshield interlayers of the present invention are wedge shaped. As used herein, an interlayer or polymer sheet is said to be "wedge shaped" if the average thickness of the interlayer or polymer sheet as measured at one edge is at least 0.13 millimeters greater than the average thickness of the interlayer or polymer sheet as measured at the opposite edge. Wedge shaped interlayers of the present invention, in cross section, can resemble, for example, an isosceles trapezoid or a right trapezoid, among others, when they are first formed. The thickness transitions of the cross-section of the polymer sheet can occur gradually, or can be immediate. The rate of the thickness change from one edge of the polymer sheet to the opposite edge can be continuous, or can vary to the extent that the profile may be flat with no rate of thickness change in certain areas of the cross section of the polymer sheet. Likewise, the rate of thickness change may decrease or increase throughout the cross section of the polymer sheet as long as one edge of the polymer sheet is greater in thickness than the other edge. Of course, after lamination with non-planar rigid substrates such as curved glass windshields, the wedge shaped interlayer will conform to the contours of the laminate.

The wedge shaped interlayers of the present invention can be formed from a single polymer sheet, or from two or more polymer sheets. As will be described in detail below, polymer sheets can be any suitable thermoplastic polymer, for example poly(vinyl butyral).

In various embodiments, wedge shaped interlayers of the present invention are formed from a single polymer sheet. In various embodiments, the polymer sheet can be a wedge shaped polymer sheet that has been formed from a single acoustic polymer melt (as defined herein) in a single melt extrusion process. In other embodiments, a single polymer sheet can be formed through a coextrusion process in which an acoustic polymer melt and a non acoustic polymer melt (as defined herein) are coextruded to form a single wedge shaped polymer sheet having an acoustic region and a non acoustic region. In various coextrusion embodiments, the regions are formed so as to approximate two separate layers within the single sheet, which emulates the effect that would be achieved if two separate polymer sheets—an acoustic and a non acoustic—had been laminated together. In yet other embodiments, a first acoustic polymer melt and a second, different acoustic polymer melt can be coextruded to form a wedge shaped interlayer having two different acoustic regions. Again, each region approximates a layer within the sheet.

For any of the coextrusion embodiments described in the previous paragraph, a further coextrusion region can be formed from acoustic or non acoustic material, as desired. For example, a wedge shaped polymer sheet can be formed by coextruding an acoustic polymer melt between two non acoustic polymer melts to form a three region wedge shaped polymer sheet that can be used as a noise suppressing interlayer. This embodiment has the advantage of relatively low blocking. Further coextrusion regions can be formed with tinted melts, for example, to form color gradient regions within the polymer sheet.

In any of the embodiments in which a single wedge shaped polymer sheet is used to form a wedge shaped windshield interlayer, one edge of the polymer sheet can have an edge with a thickness that is at least 0.13 millimeters, at least 0.2 millimeters, at least 0.3 millimeters, at least 0.4 millimeters, at least 0.5 millimeters, at least 0.7 millimeters, or at least 1.0 millimeters greater than the thickness of the opposite edge, which difference forms a wedge shape.

In any of the embodiments in which a single wedge shaped polymer sheet is used to form a wedge shaped windshield interlayer, the thinner edge can have a thickness of, for example, at least 0.38 millimeters, at least 0.45 millimeters, at least 0.75 millimeters, at least 1.0 millimeters, and/or from 0.38 to 2.5 millimeters, 0.4 to 2.0 millimeters, 0.5 to 1.75 millimeters, or 0.6 to 1.5 millimeters.

In various other embodiments, windshield interlayers of the present invention comprise more than one polymer sheet, and, optionally, other polymeric layers and/or other layers. In these embodiments, at least one of the polymer sheets is an acoustic polymer sheet or a polymer sheet having an acoustic region, as defined herein.

As shown in FIG. 1 generally at 10, a two layer embodiment comprises a wedge shaped polymer sheet 14 and a flat polymer sheet 12. The wedge shaped polymer sheet 14 and the flat polymer sheet 12 together form a wedge shaped interlayer having a first thickness, T1, and a second thickness, T2. As described above for single layer embodiments, one edge of the wedge shaped interlayer can have an edge with a thickness (T2) that is at least 0.13 millimeters, at least 0.2 millimeters, at least 0.3 millimeters, at least 0.4 millimeters, at least 0.5 millimeters, at least 0.7 millimeters, or at least 1.0 millimeters greater than the thickness of the opposite edge (T1), which difference forms a wedge shape. Further, T1, as shown in FIG. 1, can have a thickness of, for example, at least 0.38 millimeters, at least 0.45 millimeters, at least 0.75 millimeters, at least 1.0 mm, and/or from 0.38 to 2.5 millimeters, 0.4 to 2.0 millimeters, 0.5 to 1.75 millimeters, or 0.6 to 1.5 millimeters.

The schematic representation of one embodiment of a wedge shaped interlayer of the present invention illustrated in FIG. 1 shows a thickness transition of the cross-section of the polymer sheet that occurs immediately and at a continuous and constant rate of the thickness change.

For wedge shaped interlayer embodiments where the rate of thickness change from one edge of the polymer sheet to the opposite polymer sheet is continuous and constant, the wedge angle, formed between the wedge shaped surface and the opposite surface, can be calculated from the algorithm:

$$\tan\alpha = \frac{T2 - T1}{W}$$

Where $\alpha$ is the wedge angle, in milliradians; T1 and T2 are defined in FIG. 1, and W is the width of the wedge shaped interlayer sheet.

For wedge shaped interlayer embodiments of the present invention in which two or more layers are used, at least one of the layers is an acoustic polymer sheet or a coextruded polymer sheet having an acoustic region, as described above. For example, the wedge shaped polymer sheet 14 can be an acoustic polymer sheet and the flat polymer sheet 12 can be a non acoustic polymer sheet. The reverse is also acceptable, where the wedge shaped polymer sheet 14 is a non acoustic polymer sheet and the flat polymer sheet 12 is an acoustic polymer sheet.

In yet further embodiments, one or more further layer of polymer sheet are incorporated into the construct shown in FIG. 1. For example, a third polymer sheet, acoustic or non acoustic and wedge shaped or non wedge shaped can be incorporated. Any suitable configuration of polymer sheets and sheet types can be used to form a wedge shaped interlayer, and in various embodiments, the overall dimensions of these multiple layered interlayers will be within the ranges given above for thicknesses for single polymer sheet embodiments.

In various embodiments, a polymer film layer such as poly(ethylene terephthalate), as described elsewhere herein, can be included in a multiple layer construct of the present invention. For example, a polymer film can be included between the wedge shaped polymer sheet 14 and the flat polymer sheet 12 in FIG. 1 to produce a three layer embodiment in which a polymer film is incorporated between two polymer layers. In yet further embodiments, two or more polymer films can be incorporated into multiple layer interlayer embodiments of the present invention.

In various embodiments of the present invention, interlayers of the present invention, when laminated between two sheets of glass panes, reduce the transmission of sound through the laminated glass panel by at least 2 decibels (dB) at the coincident frequency relative to a comparable laminated glass panel having a single conventional interlayer consisting of a non acoustic polymer sheet having the same shape as an interlayer of the present invention.

In various embodiments of the present invention, interlayers of the present invention, when laminated between two sheets of glass panes, improve the sound transmission loss by at least 2 dB, more preferably 4 dB, and even more preferably 6 dB or higher, say 8 dB at the coincident frequency relative to a comparable laminated glass panel having a single conventional interlayer consisting of a non acoustic polymer sheet having the same shape as an interlayer of the present invention.

For each embodiment described herein comprising a glass layer, another embodiment exists, where suitable, wherein a glazing type material is used in place of the glass. Examples of such glazing layers include rigid plastics having a high glass transition temperature ($T_g$), for example above 60° C. or 70° C., for example polycarbonates, polyesters, polyalkyl methacrylates, and specifically those having from 1 to 3 carbon atoms in the alkyl moiety.

In addition to the interlayers provided herein, the present invention also provides methods of reducing the level of sound through an opening, comprising the step of disposing in the opening a multiple layer glass panel comprising any of the wedge shaped interlayers of the present invention.

The present invention also includes methods of manufacturing a multiple layer glazing, comprising laminating any of the interlayers of the present invention between two rigid, transparent panels, as are known in the art, such as glass or acrylic layers.

The present invention also includes multiple layer glass panels, such as windshields and architectural windows, comprising a multiple layer interlayer of the present invention. Also included are multiple layer glazing panels having plastics, such as acrylics, or other suitable materials in place of the glass panels.

Polymer Film

As used herein, a "polymer film" means a relatively thin and rigid polymer layer that functions as a performance enhancing layer. Polymer films differ from polymer sheets, as used herein, in that polymer films do not themselves provide the necessary penetration resistance and glass retention properties to a multiple layer glazing structure, but rather provide performance improvements, such as infrared absorption or reflection character. Poly(ethylene terephthalate) is most commonly used as a polymer film.

The polymer film is preferably optically transparent (i.e. objects adjacent one side of the layer can be comfortably seen by the eye of a particular observer looking through the layer from the other side), and usually has a greater, in some embodiments significantly greater, tensile modulus regardless of composition than that of an adjacent polymer sheet. In various embodiments, the polymer film comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like.

In various embodiments, the polymer film comprises materials such as re-stretched thermoplastic films having the noted properties, which include polyesters. In various embodiments, the polymer film comprises or consists of poly(ethylene terephthalate), and, in various embodiments, the polyethylene terephthalate has been biaxially stretched to improve strength, and/or has been heat stabilized to provide low shrinkage characteristics when subjected to elevated temperatures (e.g. less than 2% shrinkage in both directions after 30 minutes at 150° C.).

An additional type of polymer film that can be used with the present invention, which is described in U.S. Pat. No. 6,797,396, comprises a multitude of nonmetallic layers that function to reflect infrared radiation without creating interference that can be caused by metallic layers.

In various embodiments, the polymer film can have a thickness of 0.013 millimeters to 0.20 millimeters, 0.025 millimeters to 0.10 millimeters, or 0.04 to 0.06 millimeters. The polymer film can optionally be surface treated or coated with a functional performance layer to improve one or more properties, such as adhesion or infrared radiation reflection. These functional performance layers include, for example, a multilayer stack for reflecting infra-red solar radiation and transmitting visible light when exposed to sunlight. This multilayer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known (see, for example, U.S. Pat. Nos. 4,017,661 and 4,786,783), the metal layer(s) may optionally be electrically resistance heated for defrosting or defogging of any associated glass layers. Various coating and surface treatment techniques for poly(ethylene terephthalate) film and other polymer films that can be used with the present invention are disclosed in published European Application No. 0157030. Polymer films of the present invention can also include a hardcoat and/or and antifog layer, as are known in the art.

Polymer Sheet

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

Polymer sheets of the present invention are acoustic polymer sheets or non acoustic polymer sheets. As used herein, an "acoustic polymer sheet" is a polymer sheet that has a glass transition temperature of less than 25° C. and that causes an improved sound transmission loss, as defined elsewhere herein and which can be measured as described elsewhere herein, of at least 2 decibels. In various embodiments, acoustic polymer sheets of the present invention have glass transition temperatures of less than 25° C., less than 20° C., less than 15° C., or less than 10° C., while being greater than −15° C. Non acoustic polymer sheets are polymer sheets that both do not have a glass transition temperatures of less than 25° C. and that cause an improvement in sound transmission loss of less than 2 decibels when compared with an otherwise equivalent polymer sheet having a glass transition temperature of between 30-33° C. Further, as used herein, an "acoustic polymer melt" is any polymer melt that, when formed into a polymer sheet, has the qualities just described for an acoustic polymer sheet, and a "non acoustic polymer melt" is any polymer melt that, when formed into a polymer sheet, has the qualities just described for a non acoustic polymer sheet.

A single polymer melt that is used to form a wedge shaped polymer sheet can be formed through the blend of two or more different polymeric materials. In some embodiments, a single polymer sheet can exhibit multiple glass transition temperatures. A polymer sheet formed through such a melt that has at least one glass transition temperature less than 25° C., as used herein, is said to have a glass transition temperature of less than 25° C.

A single polymer sheet that is formed through a coextrusion process in which an acoustic polymer melt and a non acoustic polymer melt are coextruded to form a single wedge shaped polymer sheet having an acoustic region and a non acoustic region can have two or more glass transition temperatures in which at least one of the glass transition temperatures is less than 25° C. and at least one of the glass transition temperatures is greater than 25° C.

Similarly, a wedge shaped interlayer that comprises an acoustic polymer sheet and a non acoustic polymer sheet, wherein at least one of the polymer sheets is wedge shaped, can have multiple glass transition temperatures wherein at least one of the glass transition temperatures is less than 25° C. and at least one of the glass transition temperature is greater than 25° C.

The polymer sheet can comprise any suitable polymer, and, in a preferred embodiment, the polymer sheet comprises poly (vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, polyvinyl chloride, poly(ethylene vinyl acetate), combinations thereof, and the like. In other embodiments, the polymer sheet comprises plasticized poly(vinyl butyral). In further embodiments the polymer sheet comprises poly(vinyl butyral) and one or more other polymers. Other polymers having a suitable glass transition temperature can also be used.

In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly (vinyl butyral) can be produced by known acetalization processes that involve reacting poly(vinyl alcohol) with butyraldehyde in the presence of an acid catalyst, followed by neutralization of the catalyst, separation, stabilization, and drying of the resin, with the understanding that in various embodiments, residual hydroxyl content will be controlled, as described elsewhere herein.

In various embodiments, the polymer resin can comprise less than 25 wt. % residual ester groups, 20 wt. %, 15 wt. %, 10 wt. %, 7 wt. %, 5 wt. %, or less than 3 wt. % residual ester groups calculated as polyvinyl acetate, with the balance, other than residual hydroxyl, being an acetal, preferably butyraldehyde acetal, but optionally including other acetal groups in a minor amount, e.g., a 2-ethyl hexanal group (see, for example, U.S. Pat. No. 5,137,954).

In various embodiments it is advantageous to use poly (vinyl butyral) having a residual poly(vinyl alcohol) content, by weight, of 9% to 50%, 10% to 50%, 11% to 40%, 15% to 30%, or 20% to 30%, although other ranges can be used as well. It is also advantageous in some applications to use poly(vinyl butyral) having a residual poly(vinyl alcohol) content, by weight, of greater than 25%, greater than 27%, or greater than 30%.

In various embodiments, the polymer sheet comprises poly (vinyl butyral) having a molecular weight greater than 30,000, 40,000, 50,000, 55,000, 60,000, 65,000, 70,000, 120,000, 250,000, or 350,000 grams per mole (g/mole or Daltons). Small quantities of a dialdehyde or trialdehyde can also be added during the acetalization step to increase molecular weight to greater than 350 Daltons (see, for example, U.S. Pat. Nos. 4,874,814; 4,814,529; and 4,654,179). As used herein, the term "molecular weight" means the weight average molecular weight.

In various embodiments of polymer sheets of the present invention, non acoustic polymer sheets can comprise 10 to 90, 15 to 85, 20 to 60, 25 to 60, 20 to 80, 25 to 70, and 25 to 60 parts plasticizer per hundred resin ("phr") parts. Of course other quantities can be used as is appropriate for the particular application. The poly(vinyl butyral) sheet preferably comprises 20 to 80, and more preferably 25 to 60, parts plasticizer per one hundred parts of resin. In some embodiments, the plasticizer has a hydrocarbon segment of less than 20, less than 15, less than 12, or less than 10 carbon atoms. The amount of plasticizer can be adjusted to affect the glass transition temperature of the poly(vinyl butyral) sheet.

Conventional, non acoustic poly(vinyl butyral) interlayer typically has a glass transition temperature in the range of 30-33° C. Acoustic poly(vinyl butyral) can differ from non acoustic interlayer in various ways, including modification to the mole ratio of the average amount of ethylene groups bonded to acetyl groups, the degree of acetalization, the length of aldehyde groups, and/or the amount of plasticizer. For instance, the acoustic interlayer can be obtained by increasing the concentration of plasticizer and/or with a reduction in the hydroxyl content of the polyvinyl butyral resin, sufficient to reduce the glass transition temperature from about 30° C. to about 18° C. or lower. In general, higher amounts of plasticizer are added to decrease the glass transition temperature. In various embodiments of the present invention, an acoustic polymer sheet comprises, for example, 30-100 phr of plasticizer, 40-90 phr of plasticizer, 50-85 phr of plasticizer, or 60-80 phr of plasticizer.

Acoustic polymer sheets can also be obtained by using an unmodified poly(vinyl butyral) that is typically used in conventional interlayer, a compatiblizer agent, and a plasticizer. The role of the compatiblizer agent is to make the poly(vinyl butyral) resin and the plasticizer more compatible to reduce the glass transition temperature of the interlayer. The compatiblizer can be added at 2 to 50 phr. Examples of compatiblizer agents include, but are not limited to, tri-ethylene glycol, tetra-ethylene glycol or oligomers of ethylene glycols; propylene glycol and its oligomers; tri-ethylene glycol mono-(2-ethylhexanoate), and other alkyl, aryl hydrocarbons containing ethylene glycol or propylene glycol moieties, and their chemical derivatives.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In preferred embodiments, the plasticizer is triethylene glycol di-(2-ethylhexanoate).

Adhesion control agents (ACAs) can also be included in the polymer sheets of the present invention to impart the desired adhesiveness. These agents can be incorporated into the outer sheets in a three polymer sheet embodiment, for example. Any of the ACAs disclosed in U.S. Pat. No. 5,728,472 can be used. Additionally, residual sodium acetate and/or potassium acetate can be adjusted by varying the amount of the associated hydroxide used in acid neutralization. In various embodiments, polymer sheets of the present invention comprise, in addition to sodium acetate, magnesium bis(2-ethyl butyrate)(chemical abstracts number 79992-76-0). The magnesium salt can be included in an amount effective to control adhesion of the polymer sheet to glass.

Additives may be incorporated into the polymer sheet to enhance its performance in a final product. Such additives include, but are not limited to, plasticizers, dyes, pigments, stabilizers (e.g., ultraviolet stabilizers), antioxidants, flame retardants, other IR absorbers, anti-block agents, combinations of the foregoing additives, and the like, as are known in the art.

Agents that selectively absorb light in the visible or near infrared spectrum can be added to any of the appropriate polymer sheets. Agents that can be used include dyes and pigments such as lanthanum hexaboride ($LaB_6$), indium tin oxide, and antimony tin oxide.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a mixture of resin with a plasticizer and, optionally, other additives.

Any suitable method can be used to produce the polymer sheets and the multiple layer interlayers of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, 3$^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

One exemplary method of forming a poly(vinyl butyral) layer comprises extruding molten poly(vinyl butyral) comprising resin, plasticizer, and additives and then forcing the melt through a sheet die (for example, a die having an opening that is substantially greater in one dimension than in a perpendicular dimension). A sheet die can be used to produce the wedge shaped polymer sheet in such a way that the die opening is controlled and/or altered across the width of the die to produce the desired wedge thickness profile while melt is being forced through the die. Wedge shaped layers can be formed by using an appropriately wedge shaped sheet die.

Another exemplary method of forming a poly(vinyl butyral) layer comprises casting a melt from a die onto a roller, solidifying the resin, and subsequently removing the solidified resin as a sheet. In either embodiment, the surface texture at either or both sides of the layer may be controlled by adjusting the surfaces of the die opening or by providing texture at the roller surface. Other techniques for controlling the layer texture include varying parameters of the materials (for example, the water content of the resin and/or the plasticizer, the melt temperature, molecular weight distribution of the poly(vinyl butyral), or combinations of the foregoing parameters). Furthermore, the layer can be configured to include spaced projections that define a temporary surface irregularity to facilitate the de-airing of the layer during lamination processes after which the elevated temperatures and pressures of the laminating process cause the projections to melt into the layer, thereby resulting in a smooth finish.

Polymer sheets of the present invention that comprise acoustic and non acoustic regions can be produced by any method known in the art. In a typical method, two or more melts comprising polymer resin, plasticizer, and any desired additives can be independently formed and coextruded to form a single polymer sheet having regions corresponding to each melt used. For example a first melt that, if used alone, would result in a sheet with a glass transition temperature of 20° C., and a second melt that, if used alone, would result in a sheet with a glass transition temperature of 30° C., can be coextruded to form a polymer sheet having a first region and a second region, each approximating the shape of an individual sheet, wherein the first region has a glass transition temperature of 20° C. and the second region has a glass transition temperature of 30° C.

Interlayers of the present invention that comprise more than one polymer sheet can be produced through a calendaring or pre-lamination process. In a typical method, an acoustic polymer sheet and a non acoustic polymer sheet, wherein at least one of the sheets is wedge shaped, are combined under pressure and heat to form an interlayer. The acoustic polymer sheet, if wedge shaped, is formed through a single polymer melt or through a coextrusion process as described in various embodiments in the previous paragraphs.

The following paragraphs describe various techniques that can be used to improve and/or measure the characteristics of the polymer sheet.

The clarity of a polymer sheet, and particularly a poly (vinyl butyral) layer, can be determined by measuring the haze value, which is a quantification of the amount of light scattered away from the direction of the incident beam in passing through the layer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

The visible transmittance can be quantified using a UV-Vis-NIR spectrophotometer such as the Lambda 900 made by Perkin Elmer Corporation by methods described in international standard ISO 9050:1990. In various embodiments, the transmittance through a polymer sheet of the present invention is at least 60%, at least 70%, or at least 80%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −18° C. (0° F.) and manually pummeled with a hammer to break the glass. All broken glass that is not adhered to the poly(vinyl butyral) layer is then removed, and the amount of glass left adhered to the poly(vinyl butyral) layer is visually compared with a set of standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. Poly(vinyl butyral) layers of the present invention can have, for example, a pummel value of between 3 and 10.

The "yellowness index" of a polymer sheet can be measured according to the following: Transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness. In various embodiments of the present invention, a polymer sheet can have a yellowness index of 12 or less, 10 or less, or 8 or less.

As used herein glass transition temperature of polymer sheets is determined by rheometric dynamic shear mode analysis using the following procedure. A thermoplastic polymer sheet is molded into a sample disc of 25 millimeters (mm) in diameter. The polymeric sample disc is placed between two 25 mm diameter parallel plate test fixtures of a Rheometrics Dynamic Spectrometer II (available from Rheometrics, Incorporated, Piscataway, N.J.). The polymer sheet sample disc is tested in shear mode at an oscillation frequency of 1 Hertz as the temperature of the sample is increased from −20° C. to 70° C. at a rate of 2° C./minute. The position of the maximum value of tan delta (damping) plotted as dependent on temperature is used to determine glass transition temperature.

As used herein, conventional laminated glass is formed through laminating a conventional interlayer consisting of a non-acoustic polymer sheet having the same shape as an interlayer of the present invention between two sheets of rigid glass panes. For the purpose of the present invention, the conventional laminated glass is referred to as "reference laminate panel".

Improvement in acoustic insulation as used to characterize glass laminates consisting of the interlayers of the present invention is determined with reference to a reference laminate panel as described in previous paragraph. In typical laminates with two outer layers of glass, the "combined glass thickness" is the sum of the thickness of the two layers of glass; in more complex laminates with three or more layers of glass, the combined glass thickness would be the sum of the three or more layers of glass.

For purposes of the present invention a "coincident frequency" means the frequency at which a panel exhibit a dip in sound transmission loss due to "coincident effect" (see Lu, J; Windshields with New PVB Interlayer for Vehicle Interior Noise Reduction and Sound Quality Improvement—SAE Paper # 2003-01-1587). The coincident frequency of the reference panel is typically in the range of 2,000 to 6,000 Hertz, and can be empirically determined from a monolithic sheet of glass having a thickness equal to the combined glass thickness of glass in the reference panel from the algorithm $$f_c = \frac{15,000}{d}$$

where "d" is the total glass thickness in millimeters and "$f_c$" is in Hertz.

For purposes of this invention, improvement in acoustic performance can be measured by an increase in sound transmission loss at the coincident frequency (reference frequency) of the reference panel.

"Sound transmission loss" is determined for a laminate of the present invention or conventional reference panel of fixed dimensions with ASTM E90 (95) at a fixed temperature of 20° C.

Glass laminates using interlayers of the present invention can be prepared by known procedures, for example as disclosed in U.S. Pat. Nos. 5,024,895; 5,091,258; 5,145,744; 5,189,551;5,264,058 and 5,529,654. Preferred glass is heat strengthened, float glass and may be tinted or coated with metal and/or metal oxide layers to reflect specific portions of the electromagnetic spectrum, for example, infrared. Preferred glass laminates are made with glass that is not more than 3.2 mm thick, preferably thinner, for example not more than 2.5 mm thick, and more preferably not more than 2.3 mm thick. A glass laminate can comprise glass of different thicknesses, for example 1.6 mm and 2.3 mm. In a typical safety glass lamination process, a three layer assembly of glass, polymer interlayer, and glass is assembled and heated to a glass temperature of about 25° C. to 50° C. and then passed through a pair of nip rolls to expel trapped air. The compressed assembly is then heated, for example by infrared radiation or in a convection oven, to a temperature of about 60° C. to 110° C. for a short period, for example about 1 to 5 minutes. The heated assembly is then passed through a second pair of nip rolls followed by autoclaving the assembly at about 130° C. to 150° C. and about 1,000 to 2,000 kilo Pascals for about 30 minutes. Non-autoclave methods as disclosed in U.S. Pat. No. 5,536,347 are also useful.

EXAMPLES

The following examples are intended to illustrate and not limit or restrict the scope of the invention. Laminates used to illustrate the invention are prepared using the following materials:

3GEH: triethylene glycol di(2-ethylhexanoate) plasticizer.

Glass: annealed float glass in thickness of 2.1 or 2.3 millimeters.

PVB: Non wedge shaped poly(vinyl butyral) having 18.7% hydroxyl content, containing 38 phr 3GEH and having a glass transition temperature of 30° C., at a thickness of 0.38 mm (15 mil).

C-PVB: Conventional wedge shaped poly(vinyl butyral) having 18.7% hydroxyl content, containing 38 phr 3GEH and having a glass transition temperature of 30° C., at a thickness in one edge of the sheet of 0.76 mm (30 mil) and on the opposite edge of 1.14 mm (45 mil), and a sheet width of 1,000 mm.

A-PVB1: Non-wedge shaped acoustic poly(vinyl butyral) having low (16%) hydroxyl content, containing 50 phr 3GEH plasticizer, having a glass transition temperature of 18° C., and being 0.5 mm (20 mil) thick.

A-PVB2: Wedge shaped acoustic poly(vinyl butyral) having low (16%) hydroxyl content, containing 50 phr 3GEH plasticizer, having a glass transition temperature of 18° C., at a thickness in one edge of the sheet of 1.0 mm and on the opposite edge of 1.42.

A-PVB3: Non-wedge shaped co-extruded three-layer acoustic poly(vinyl butyral) being 0.80 mm thick, wherein two outer layers containing 38 phr 3GEH and having a glass transition temperature of about 30° C. and the inner layer having low (12%) hydroxyl content, containing 75 phr 3GEH plasticizer, having a glass transition temperature of about 2° C., and being 0.13 mm (5 mil) thick.

Panels for acoustic testing comprising glass with various polymeric interlayers are constructed into 48×75 cm panels of components assembled as indicated in Tables 1 through 4. PVB interlayer film is conditioned in a humidity cabinet to a targeted moisture level of 0.43%, and hand laid up on a glass sheet preheated to 40° C. In case of panels containing multi-layer interlayer the individual layers are stacked on the preheated glass in the order indicated. A second glass sheet preheated to 40° C. is placed on top of the stacked interlayer sheets. The panel is then compressed by passing through nip rollers adjusted to 40 psig to de-air the structure and to tack the interlayer to the glass surface. The "de-aired" panel is placed in a preheated oven at 105° C. for about 20 minutes and passed through the nip rollers a second time for further de-airing and to edge seal the panel. The panel is then air autoclaved (heated at elevated temperature and pressure).

TABLE 1

(Prior Art)

| No. | Interlayer Components | Wedge Angle, mrad | $T_g$ (° C.) |
|---|---|---|---|
| 1 | PVB | 0 | 30 |
| 2 | C-PVB | 0.38 | 30 |

TABLE 2

(Prior Art, Reference Panels)

| No. | Interlayer | Glass* | Coincident Freq. (Hz) | STL at coincident freq (dB) |
|---|---|---|---|---|
| 3. | C-PVB | 2.1-mm | 4000 | 31 |
| 4. | C-PVB | 2.3-mm | 3150 | 31 |

*Glass laminate consists of glass sheet/interlayer/glass sheet. The thickness of each glass sheet is indicated in the Table above.

TABLE 3

| No. | Interlayer Components | Wedge Angle, mrad | $T_g$ (° C.) |
|---|---|---|---|
| 5 | A-PVB2 | 0.42 | 18 |
| 6 | A-PVB2/PVB | 0.42 | 18 and 30 |
| 7 | A-PVB1/C-PVB | 0.38 | 18 and 30 |
| 8 | A-PVB3/C-PVB | 0.38 | 2 and 30 |
| 9 | A-PVB1/A-PVB2 | 0.42 | 18 |

TABLE 4

| No. | Interlayer components* | STL at the reference freq (dB) | Improvement in STL (dB) |
|---|---|---|---|
| 10 | A-PVB2 | 38 | 7 |
| 11 | A-PVB2/PVB | 38 | 7 |
| 12 | A-PVB1/C-PVB | 37 | 6 |
| 13 | A-PVB3/C-PVB | 38 | 7 |

*Glass laminates for STL measurements consist of glass sheet/interlayer components/glass sheet. The thickness of each glass sheet is 2.1-mm.

By virtue of the present invention, it is now possible to provide acoustic wedge shaped interlayers that reduce sound transmission through a windshield.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising wedge shapes in any of the ranges given in addition to any of the ranges given for plasticizer, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A windshield interlayer, comprising:
a plasticized poly(vinyl butyral) polymer sheet comprising 40-90 phr plasticizer and having a glass transition temperature of less than 25° C., wherein said windshield interlayer is wedge shaped and has a first edge and a second edge, wherein said first edge has a thickness of at least 0.38 millimeters and said second edge has a thickness that is at least 0.13 millimeters greater than said thickness of said first edge, and wherein said polymer sheet shows an improved sound transmission loss of at least two decibels relative to an equivalent polymer sheet having a glass transition temperature between 30-33 ° C.

2. The windshield interlayer of claim 1, wherein said windshield interlayer further comprises a second polymer sheet.

3. The windshield interlayer of claim 2, wherein said second polymer sheet is not wedge shaped and said polymer sheet having a glass transition temperature of less than 25° C. is wedge shaped.

4. The windshield interlayer of claim 2, wherein said second polymer sheet is wedge shaped and said polymer sheet having a glass transition temperature of less than 25° C. is not wedge shaped.

5. The windshield interlayer of claim 2, further comprising a polymer film layer disposed between said polymer sheet having a glass transition temperature of less than 25° C. and said second polymer sheet.

6. The windshield interlayer of claim 1, wherein said thickness of said second edge is 0.13 millimeters to 0.8 millimeters greater than said thickness of said first edge.

7. The windshield interlayer of claim 6, wherein said thickness of said second edge is 0.3 millimeters to 0.8 millimeters greater than said thickness of said first edge.

8. The windshield interlayer of claim 6, wherein said first thickness is at least 0.5 millimeters.

9. The windshield interlayer of claim 1, wherein said wedge shaped polymer interlayer does not comprise polymer sheets other than said polymer sheet having a glass transition temperature of less than 25° C.

10. The windshield interlayer of claim 9, wherein said polymer sheet having a glass transition temperature of less than 25° C. comprises an acoustic region and a non acoustic region.

11. The windshield interlayer of claim 1, wherein said windshield interlayer further comprises a polymer film.

12. The windshield interlayer of claim 1 wherein said plasticized poly(vinyl butyral) polymer sheet has a residual hydroxyl content of less than 18.7%.

13. The windshield interlayer of claim 12 wherein said plasticized poly(vinyl butyral) polymer sheet has a residual hydroxyl content of less or equal to than 16%.

14. The windshield interlayer of claim 1 wherein said plasticizer is triethylene glycol di-(2-ethylhexanoate).

15. A method for manufacturing a windshield interlayer comprising:
forming a wedge shaped windshield interlayer comprising a plasticized poly(vinyl butyral) polymer sheet comprising 40 -90 phr plasticizer and having a glass transition temperature of less than 25° C. wherein said windshield interlayer has a first edge and a second edge, wherein said first edge has a thickness of at least 0.38 millimeters and said second edge has a thickness that is at least 0.13 millimeters greater than said thickness of said first edge, and wherein said polymer sheet shows an improved sound transmission loss of at least two decibels relative to an equivalent polymer sheet having a glass transition temperature between 30 -33° C.

16. The method of claim 15, further comprising forming a second polymer sheet and laminating said second polymer sheet and said polymer sheet having a glass transition temperature of less than 25° C.

17. The method of claim 16, wherein said second polymer sheet is not wedge shaped and said polymer sheet having a glass transition temperature of less than 25° C. is wedge shaped.

18. The method of claim 16, wherein said second polymer sheet is wedge shaped and said polymer sheet having a glass transition temperature of less than 25° C. is not wedge shaped.

19. The method of claim 16, further comprising a polymer film layer disposed between said polymer sheet having a glass transition temperature of less than 25° C. and said second polymer sheet.

20. The method of claim 15, wherein said thickness of said second edge is 0.13 millimeters to 0.8 millimeters greater than said thickness of said first edge.

21. The method of claim 20, wherein said thickness of said second edge is 0.3 millimeters to 0.8 millimeters greater than said thickness of said first edge.

22. The method of claim 21, wherein said thickness of said first edge is at least 0.5 millimeters.

23. The method of claim 15, wherein said wedge shaped polymer interlayer does not comprise polymer sheets other than said polymer sheet having a glass transition temperature of less than 25° C.

24. The method of claim 15, further comprising laminating a polymer film to said polymer sheet having a glass transition temperature of less than 25° C.

25. The method of claim 16, further comprising forming said polymer sheet having a glass transition temperature of less than 25° C. by coextruding an acoustic polymer melt and a non acoustic polymer melt to form said polymer sheet having a glass transition temperature of less than 25° C., wherein said polymer sheet is wedge shaped and comprises an acoustic region and a non acoustic region.

26. The method of manufacturing a windshield interlayer of claim 15 wherein said plasticized poly(vinyl butyral) polymer sheet has a residual hydroxyl content of less than 18.7%.

27. The method of manufacturing a windshield interlayer of claim 26 wherein said plasticized poly(vinyl butyral) polymer sheet has a residual hydroxyl content of less or equal to than 16%.

28. The method of manufacturing a windshield interlayer of claim 15 wherein said plasticizer is triethylene glycol di-(2-ethylhexanoate).

29. A windshield comprising:
a windshield interlayer, comprising:
a plasticized poly(vinyl butyral) polymer sheet comprising 40-90 phr plasticizer and having a glass transition temperature of less than 25° C., wherein said windshield interlayer is wedge shaped and has a first edge and a second edge, wherein said first edge has a thickness of at least 0.38 millimeters and said second edge has a thickness that is at least 0.13 millimeters greater than said thickness of said first edge, and wherein said polymer sheet shows an improved sound transmission loss of at least two decibels relative to an equivalent polymer sheet having a glass transition temperature between 30-33° C.

30. The windshield of claim 29, wherein said windshield interlayer further comprises a second polymer sheet.

31. The windshield of claim 30, wherein said second polymer sheet is not wedge shaped and said polymer sheet having a glass transition temperature of less than 25° C. is wedge shaped.

32. The windshield of claim 30, wherein said second polymer sheet is wedge shaped and said polymer sheet having a glass transition temperature of less than 25° C. is not wedge shaped.

33. The windshield of claim 30, further comprising a polymer film layer disposed between said polymer sheet having a glass transition temperature of less than 25° C. and said second polymer sheet.

34. The windshield of claim 29, wherein said thickness of said second edge is 0.13 millimeters to 0.8 millimeters greater than said thickness of said first edge.

35. The windshield of claim 34, wherein said thickness of said second edge is 0.3 millimeters to 0.8 millimeters greater than said thickness of said first edge.

36. The windshield of claim 34, wherein said first thickness is at least 0.5 millimeters.

37. The windshield of claim 29, wherein said wedge shaped polymer interlayer does not comprise polymer sheets other than said polymer sheet having a glass transition temperature of less than 25° C.

38. The windshield of claim 37, wherein said polymer sheet having a glass transition temperature of less than 25° C. comprises an acoustic region and a non acoustic region.

39. The windshield of claim 29, wherein said windshield interlayer further comprises a polymer film.

40. The windshield of claim 29 wherein said plasticized poly(vinyl butyral) polymer sheet has a residual hydroxyl content of less than 18.7%.

41. The windshield of claim 40 wherein said plasticized poly(vinyl butyral) polymer sheet has a residual hydroxyl content of less or equal to than 16%.

42. The windshield of claim 29 wherein said plasticizer is triethylene glycol di-(2-ethylhexanoate).

43. A windshield interlayer, comprising:
a coextruded multilayer plasticized poly(vinyl butyral) polymer sheet comprising 40-90 phr plasticizer and having a region with a glass transition temperature of less than 25° C. and a region with a glass transition temperature of greater than 25° C., wherein said windshield interlayer is wedge shaped and has a first edge and a second edge and wherein said first edge has a thickness of at least 0.38 millimeters and said second edge has a thickness that is at least 0.13 millimeters greater than said thickness of said first edge, and wherein said polymer sheet shows an improved sound transmission loss of at least two decibels relative to an equivalent polymer sheet having a glass transition temperature between 30-33° C.

44. The windshield interlayer of claim 43 wherein said plasticized poly vinyl butyral) polymer sheet has a residual hydroxyl content of less than 18.7%.

45. The windshield interlayer of claim 44 wherein said plasticized poly(vinyl butyral) polymer sheet has a residual hydroxyl content of less or equal to than 16%.

46. The windshield interlayer of claim 44 wherein said plasticizer is triethylene glycol di-(2-ethylhexanoate).

* * * * *